(12) United States Patent
Vandermeijden et al.

(10) Patent No.: US 9,798,399 B2
(45) Date of Patent: Oct. 24, 2017

(54) SIDE SENSING FOR ELECTRONIC DEVICES (71) Applicant: SYNAPTICS INCORPORATED, San Jose, CA (US)

(72) Inventors: Tom Vandermeijden, Los Gatos, CA (US); Fabrice Dayan, Thonon les Bains (FR)

(73) Assignee: Synaptics Incorporated, San Jose, CA (US)

( * ) Notice: Subject to any disclaimer, the term of this patent is extended or adjusted under 35 U.S.C. 154(b) by 395 days.

(21) Appl. No.: 14/293,714

(22) Filed: Jun. 2, 2014

(65) Prior Publication Data
US 2015/0346850 A1    Dec. 3, 2015

(51) Int. Cl.
G06F 3/041    (2006.01)
G06F 1/16     (2006.01)
G06F 3/044    (2006.01)

(52) U.S. Cl.
CPC ............ *G06F 3/041* (2013.01); *G06F 1/1626* (2013.01); *G06F 3/044* (2013.01); *G06F 2203/04106* (2013.01)

(58) Field of Classification Search
CPC ............ G06F 3/041; G06F 3/033; G05G 5/00
See application file for complete search history.

(56) References Cited

U.S. PATENT DOCUMENTS

| | | | |
|---|---|---|---|
| 7,656,393 B2 | 2/2010 | King et al. | |
| 8,456,427 B2 | 6/2013 | Bytheway | |
| 8,593,431 B1 | 11/2013 | Karpin et al. | |
| 2006/0238517 A1* | 10/2006 | King | G06F 1/1626 345/173 |
| 2009/0273573 A1* | 11/2009 | Hotelling | G06F 3/0362 345/173 |
| 2009/0315838 A1 | 12/2009 | Geiger | |
| 2010/0103098 A1* | 4/2010 | Gear | G06F 1/1626 345/158 |
| 2011/0205163 A1 | 8/2011 | Hinckley et al. | |
| 2011/0209097 A1 | 8/2011 | Hinckley et al. | |
| 2012/0327027 A1* | 12/2012 | Chang | G06F 3/0416 345/174 |
| 2013/0069886 A1 | 3/2013 | Wang | |
| 2013/0244731 A1 | 9/2013 | Oishi et al. | |
| 2013/0300668 A1 | 11/2013 | Churikov et al. | |
| 2014/0118011 A1 | 5/2014 | Burger et al. | |

FOREIGN PATENT DOCUMENTS

| | | |
|---|---|---|
| WO | 2007103631 A2 | 9/2007 |
| WO | 2012004176 A1 | 1/2012 |

* cited by examiner

*Primary Examiner* — Tony N Ngo
(74) *Attorney, Agent, or Firm* — Osha Liang LLP (57) ABSTRACT

Side sensing for electronic devices. An input device has a first sensing region including a first plurality of sensor electrodes configured to sense objects in the first sensing region that are ohmically coupled to the first plurality of sensor electrodes. A second sensing region is positioned adjacent to the first sensing region and includes a second plurality of sensor electrodes configured to sense objects in the second sensing region that are ohmically isolated from a second plurality of sensor electrodes but are capacitively coupled to the second plurality of sensor electrodes.

17 Claims, 5 Drawing Sheets

SIDE SENSING FOR ELECTRONIC DEVICES

TECHNICAL FIELD

This invention generally relates to electronic devices, and more specifically relates to sensor devices and using sensor devices for producing user interface inputs.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones, notebook computers and tablet computers).

The proximity sensor device can be used to enable control of an associated electronic system. For example, proximity sensor devices are often used as input devices for larger computing systems, including: notebook computers and desktop computers. Proximity sensor devices are also often used in smaller systems, including: handheld systems such as personal digital assistants (PDAs), remote controls, and communication systems such as wireless telephones and text messaging systems. Increasingly, proximity sensor devices are used in media systems, such as CD, DVD, MP3, video or other media recorders or players. The proximity sensor device can be integral or peripheral to the computing system with which it interacts.

BRIEF SUMMARY

Embodiments of the present invention provide side sensing for electronic devices. In accordance with an embodiment, an input device is provided having a first sensing region including a first plurality of sensor electrodes configured to sense objects in the first sensing region that are ohmically coupled to the first plurality of sensor electrodes. A second sensing region is positioned adjacent to the first sensing region and includes a second plurality of sensor electrodes configured to sense objects in the second sensing region that are ohmically isolated from a second plurality of sensor electrodes but are capacitively coupled to the second plurality of sensor electrodes.

In accordance with an embodiment, a processing system is provided for an input device and includes a memory for storing instructions a processor coupled to the memory for executing the instructions. The processor has a first input for receiving signals from a first plurality of sensor electrodes via a first plurality of routing traces ohmically coupled to the first plurality of sensor electrodes, the first plurality of sensor electrodes form a first sensing region. The processor also includes second input for receiving signals from a second plurality of sensor electrodes via a second plurality of routing traces being ohmically isolated and capacitively coupled to the second plurality of sensor electrodes, the second plurality of sensor electrodes positioned in second plane that is non-parallel to the first plane to form a second sensing region.

In accordance with an embodiment, a device is provided that includes a housing having a top surface and an edge surface and a display positioned to be viewed on the top surface. A first plurality of sensor electrodes and a first plurality of routing traces ohmically coupled to the first plurality of sensor electrodes configured to sense objects in the a first sensing region. A second plurality of sensor electrodes and a second plurality of routing traces ohmically isolated from the second plurality of sensor electrodes are configured to sense objects in the a second sensing region, the second sensing region at least partly overlapping the side surface.

BRIEF DESCRIPTION OF DRAWINGS

Example embodiments of the present invention will hereinafter be described in conjunction with the appended drawings which are not to scale unless otherwise noted, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability.

Figure 1:
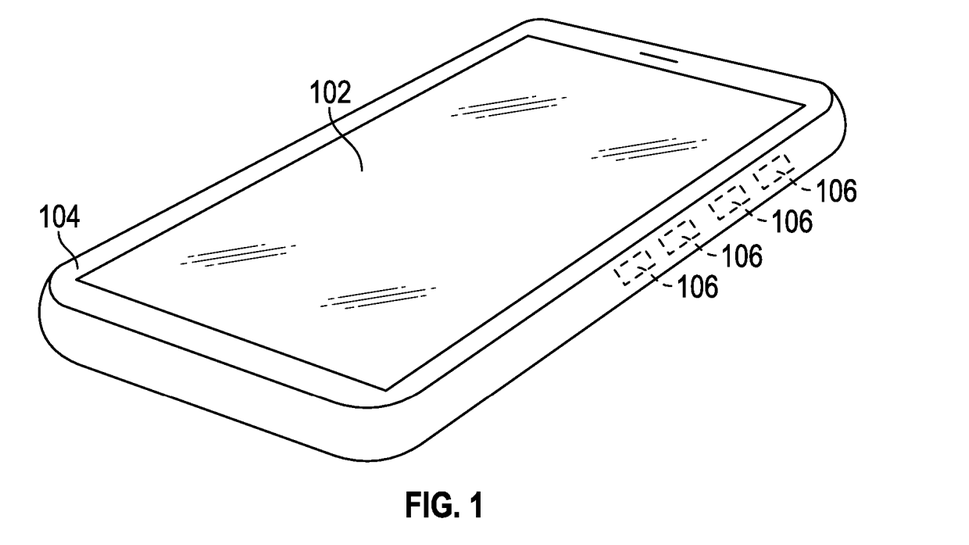
FIG. 1 is a perspective view of an electronic device in accordance with an embodiment.

Turning now to the figures, FIG. 1 is a block diagram of an exemplary input device 100, in accordance with embodiments of the invention. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Other non-limiting examples include communication devices (including cellular phones, such as smart phones), and control devices (including device remote controllers, security system controllers or home management controllers).

In FIG. 1, the input device 100 that will used as an exemplary embodiment for the description of the invention is shown as a cellular phone or smart phone having a touch sensitive display 102 mounted within a housing or bezel 104. The touch sensitive display 102 may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The touch sensitive display 102 is configured as a first sensing region to receive user input from one or more input objects such as a finger or stylus (not shown in FIG. 1). As will be explained in detail below. The input device 100 also includes one or more sensor electrodes 106 within the input device 100 aligned along a side or edge surface of the input device 100 as shown to form a second sensing region. These sensor electrodes provide additional touch sensitive input that be used as buttons or other features as will be explained below.

Figure 2:
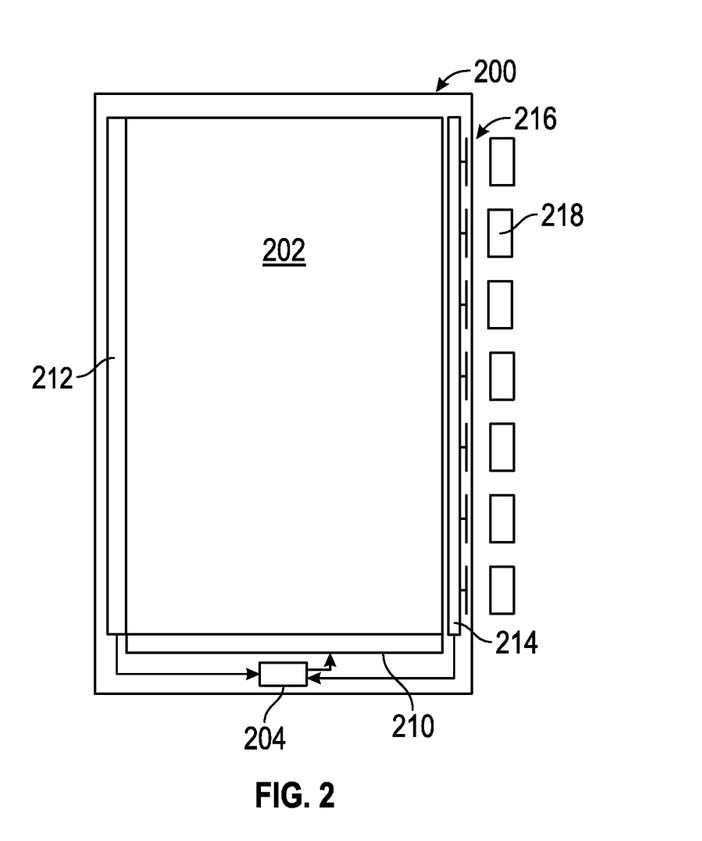
FIG. 2 is an illustration of a circuit board within the electronic device of FIG. 1 in accordance with an embodiment.

Referring now to FIG. 2, a circuit board 200 is shown that is mounted within the housing or bezel 104 of the input device of FIG. 1. The circuit board 200 may be made of any suitable material depending upon the implementation. A sensing region 202, which typically is of commensurate size with the touch sensitive screen 102 of FIG. 1, encompasses any space above, around, in and/or near the input device 100 in which the input device 100 is able to detect user input (e.g., user input provided by one or more input objects). The sizes, shapes, and locations of particular sensing regions may vary widely from embodiment to embodiment. In some embodiments, the sensing region 202 extends from a surface of the input device 100 in one or more directions into space until signal-to-noise ratios prevent sufficiently accurate object detection. The distance to which this sensing region 202 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., touch sensitive display 102) of the input device 100, contact with the input surface coupled with some amount of applied force or pressure, and/or a combination thereof. In various embodiments, the sensing region 202 has a square, rectangular, circular or oval shape as desired for any particular implementation of the input device 100.

As will be appreciated, many combinations of sensor components and sensing technologies can be employed to detect user input in the sensing region 202. As several non-limiting examples, the sensing region 202 may use capacitive, elastic, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the sensing region 202, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the sensing region 202, one or more sensing elements pick up loop currents induced by a resonating coil or pair of coils. Some combination of the magnitude, phase, and frequency of the currents may then be used to determine positional information.

In some capacitive implementations of the sensing region 202, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Figure 3:
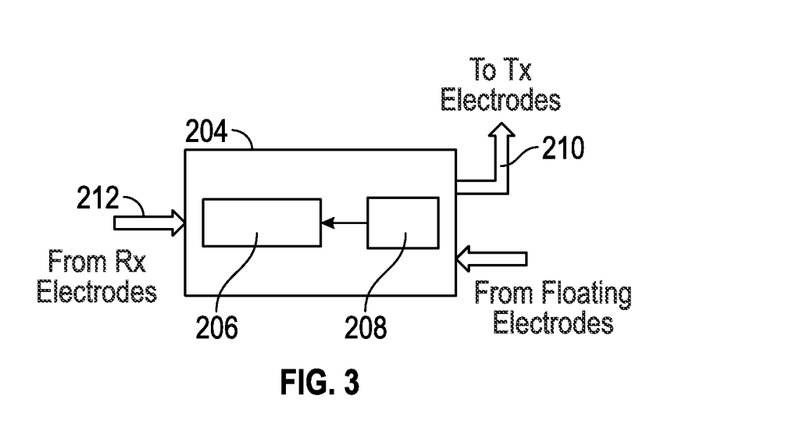
FIG. 3 is an illustration a processing system on the circuit board of FIG. 2 in accordance with an embodiment.

With continued reference to FIG. 2 and FIG. 3, a processing system 204 is shown as part of the input device 100. The processing system 204 is configured to operate the hardware of the input device 100 to detect input in the sensing region 202. The processing system 204 comprises parts of or all of one or more integrated circuits 206 (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 204 also comprises a memory 208 for storing electronically-readable instructions, such as firmware code, software code, and/or the like. In some embodiments, components composing the processing system 204 are located together, such as near the sensing region 202 of the input device 100. In other embodiments, components of processing system 204 are physically separate with one or more components close to the sensing region 202 of input device 100, and one or more components elsewhere. In the exemplary embodiment shown, the processing system 204 may comprise circuits and firmware that are part of a main processing system of the smart phone 100.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

The processing system 204 operates the sensing electrodes to produce electrical signals indicative of input (or lack of input) in the sensing region 202. In the illustrated embodiment, the processing system 204 provides signals via transmit routing traces 210 and receives signal via receive routing traces 212. The routing traces 210 and 212 are ohmically or communicatively coupled to the sensor electrodes within the sensing region 202. As used herein, ohmically or communicatively coupled mean a direct electrical connection that supports the flow of an electrical current from the sensor electrodes along the routing traces to the processing system 204.

The processing system 204 may perform any appropriate amount of processing on the electrical signals in producing the information provided to the electronic system. For example, the processing system 204 may digitize analog electrical signals obtained from the sensor electrodes. As another example, the processing system 204 may perform filtering or other signal conditioning. As yet another example, the processing system 204 may subtract or otherwise account for a baseline, such that the information reflects a difference between the electrical signals and the baseline. As yet further examples, the processing system 204 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

The processing system 204 is also coupled to routing traces 214 that are ohmically or communicatively coupled to coupling electrodes 216. The coupling electrodes 216 are ohmically isolated and operably coupled to floating electrodes 218. As used herein, operably coupled means that an input signal can be communicated or detected without an ohmic connection, such as by capacitive sensing. Although illustrated as rectangular electrodes, the floating electrodes may be of any shape, size or number as needed in any particular embodiment. The floating electrodes 218 may be positioned along a size or edge (or top or bottom) of the housing or bezel of the input device 100. The floating electrodes may be planar, curved or accurate depending upon the shape of the bezel into which they are mounted. In some embodiments, the floating electrodes 218 are positioned in a different plane than the plane of the sensing region 202 such as along an edge or side of the housing or bezel as shown in FIG. 1. For example, if the housing was rectangular, the plane of the floating electrodes 218 could be orthogonal to the plane of the sensing region 202. In other embodiments, the plane of the floating electrodes 218 could be off set at an angel to the plane of the sensing region 202.

In operation, when a user make contact with the side or edge of the bezel over a floating electrode 218, the capacitive coupling between the floating electrode and the corresponding coupling electrode changes in a measurable way. In some embodiments, the processing system 204 operates the floating electrodes 218 in the absolute capacitive mode. The processing system 204 can detect this change and determine that a user input has occurred along the side or edge of the housing. In some embodiments, the routing traces 214 of the coupling electrodes 216 may be shared or multiplexed with some of the routing traces 210 or may be shared or multiplexed with guard traces positioned along the sides of the circuit board 200 to reduce electromagnetic interference.

Figure 4:
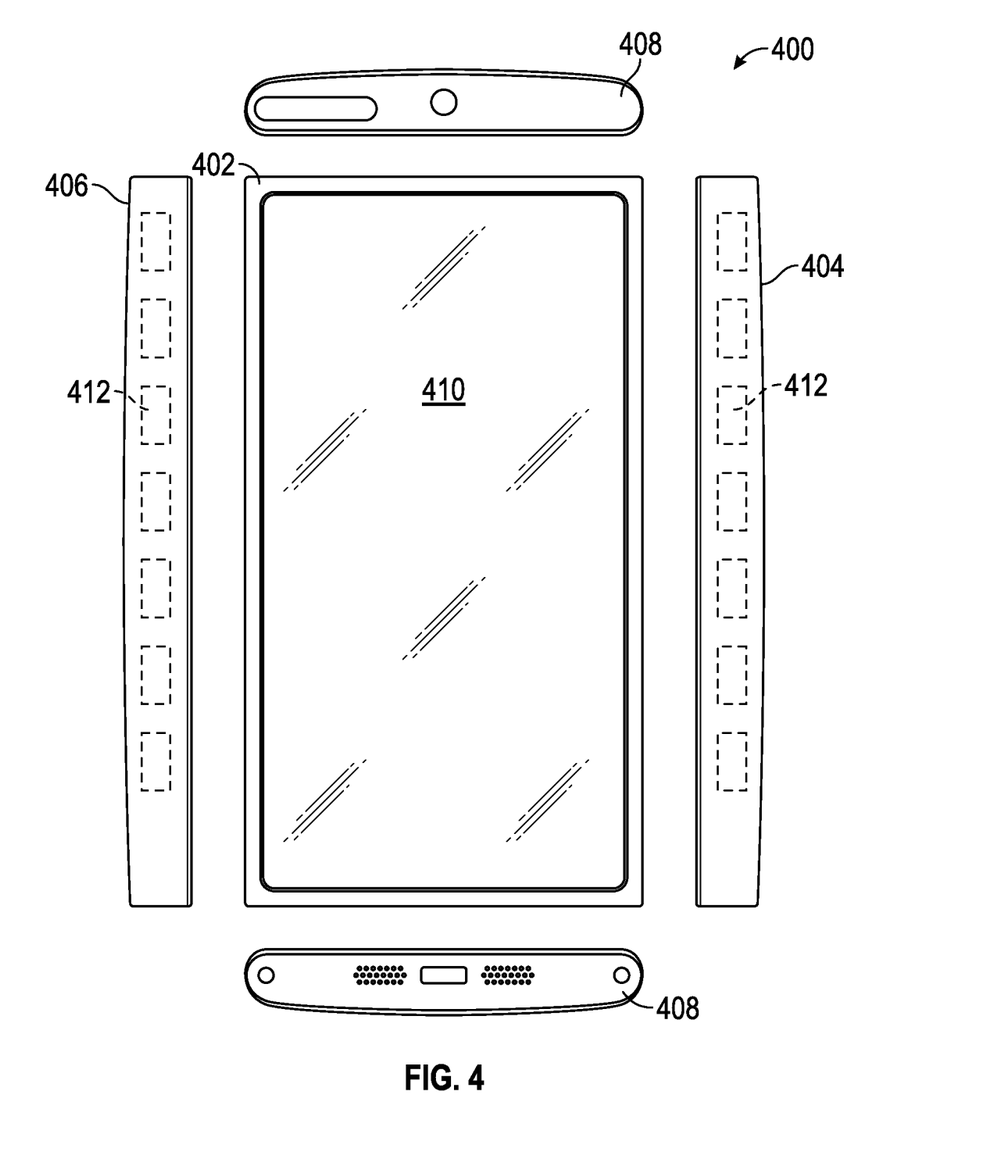
FIG. 4 is an exploded view of an electronic device in accordance with an embodiment.
Figures 5A, 5B:
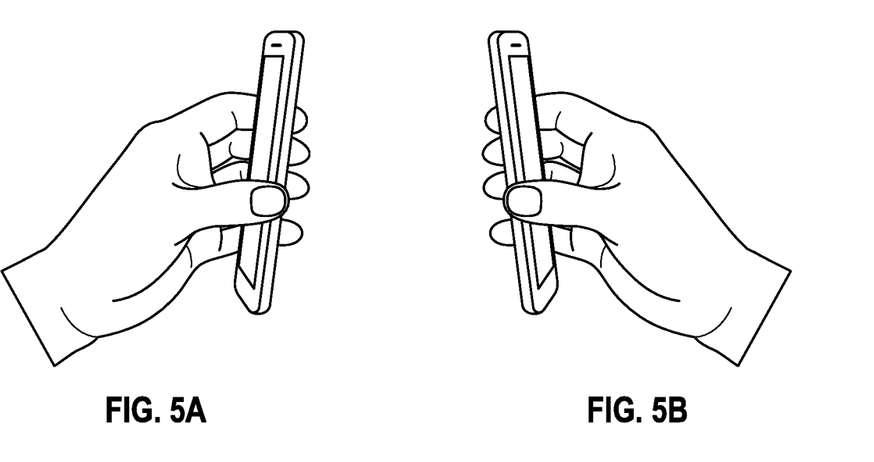
FIGS. 5A-B are illustrations of an application of the electronic device of FIG. 4 in accordance with an embodiment.
Figure 6:
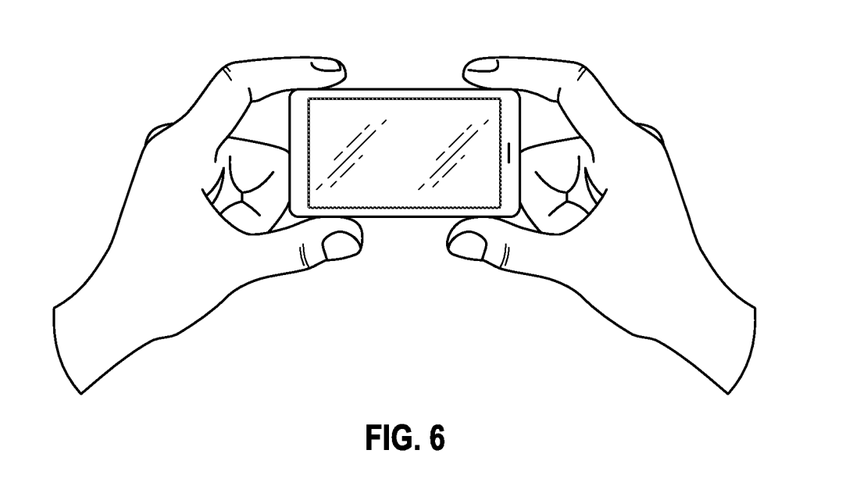
FIG. 6 is an illustration of an application of the electronic device of FIG. 4 in accordance with an embodiment.

FIG. 4 is an exploded view of an input device 400 having a housing top surface 402, side surfaces 404 and 406 and end surfaces 408. A touch sensitive display (a first sensing region) 410 is positioned in the top surface 402 of the housing. In this embodiment, each side surface 404 and 406 has a plurality of floating electrodes 412 positioned along the side surface 404 and 406 forming a second and third sensing region respectively. In addition to functioning as input surfaces for user input, the processing system can use these floating electrodes 412 (along either or both of sides 404 and 406) to determine how a user is holding the input device 400. For example, the processing system can determine whether the user is holding the input device in a left hand (FIG. 5A) or a right hand (FIG. 5B). Also, the floating electrodes can be used to determine the orientation (e.g., portrait or landscape orientation) of the input device (FIG. 6). In some embodiments, the floating electrodes 412 are used in conjunction with an accelerometer or other position sensing circuit to more quickly and accurately determine the orientation of the input device. This allows for faster display response (e.g., change from portrait to landscape orientation) for a more pleasing user experience.

Figure 7:
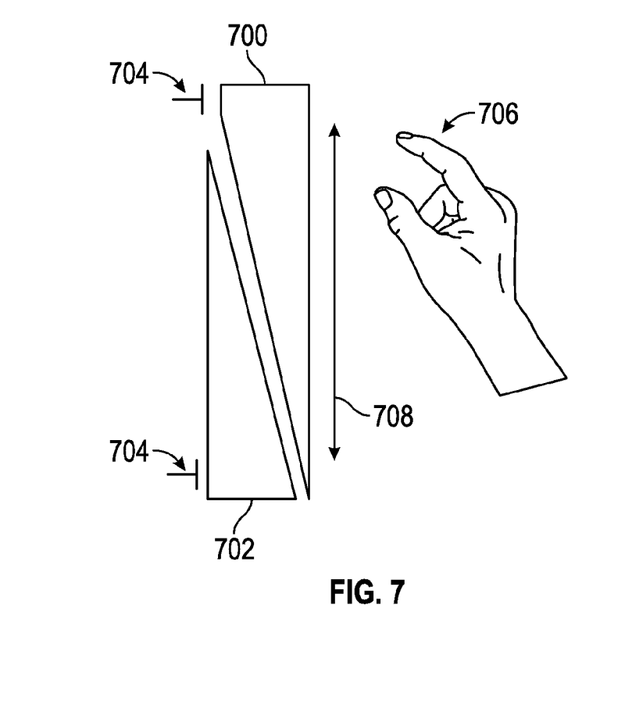
FIGS. 7-8 are illustrations of a sensing configurations for the electronic device in accordance with an embodiment.

FIG. 7 is an illustration of another embodiment for the floating electrodes to implement a slider input for the input device. The floating electrodes 700 and 702 are generally triangularly shaped and capacitively couple to the coupling electrodes 704 (which are mounted on the circuit board within the input device (see FIG. 2). When a user applies an input 706 over the floating electrodes 700 and 702, differing amounts of capacitive change will be introduced in each of the floating electrodes 700 and 702 due to the different amount of material present at the touch location. If the user then slides (as indicated by the arrow 708 the input along the sensing region, the processing system can determine direction and speed of travel of the input. This can used for any variable control feature of the input device. Non-limiting examples of such features in volume control, screen brightness or contrast and display scrolling (including variable speed scrolling).

Figure 8:
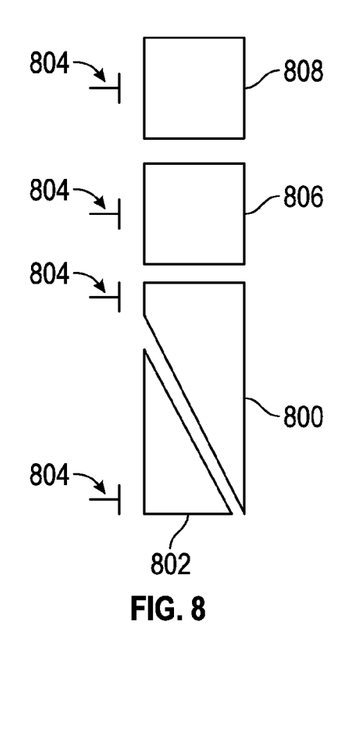

FIG. 8 illustrates how various shapes of floating electrodes can be combined to meet the needs of any particular implementation. As can be seen, floating electrodes 800 and 802 for a slider input region capacitively coupled to corresponding coupling electrodes 804, while button inputs are realized by the floating electrodes 806 and 808. As will be appreciated, the number, size, placement and combination of floating electrodes is limitless as well as being positioned on the top, back, edge or end surfaces of the housing for the input device.

Figure 9:
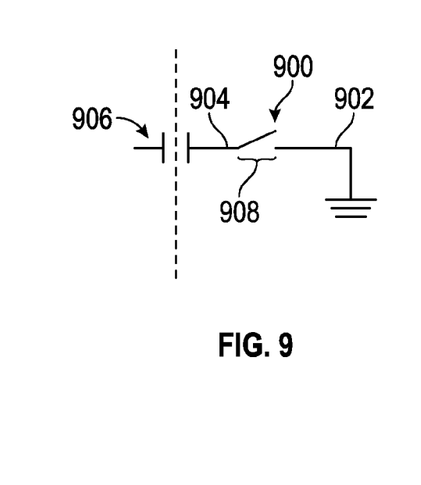
FIG. 9 is an illustration of a mechanical switch implementation for the electronic device in accordance with an embodiment.

FIG. 9 illustrates how a mechanical switch can be realized using the teaching of the present disclosure. Some users desire the tactile feel or feedback from operating a mechanical switch. Accordingly, the switch 900 has one end 902 coupled to a reference potential (e.g., ground) and the other end coupled to a coupling electrode 904. When the switch 900 is closed the coupling electrode 904 is brought to the reference potential, which changes the capacitive coupling between the coupling electrode 904 and the coupling electrode 906 on the circuit board. In this way, the positive tactile feel of a mechanical switch can be realized without the need for expensive miniature connectors that are more likely to fail after prolonged use than the configuration of FIG. 9. In some embodiments, the relative capacitive difference between the capacitive coupling between the coupling electrode 904 and the coupling electrode 906 and the internal capacitance of the switch 900 is controlled to optimize sensing of a switch closure. That is, conventional micro-switches may have considerable capacitance between the internal contacts 908. The larger the internal capacitance of the switch 900, the more difficult it becomes to accurately detect a switch closure through the series connected capacitance of the coupling electrode 904 and the coupling electrode 906. In such embodiments, it may be desirable to have the capacitive coupling between the coupling electrode 904 and the coupling electrode 906 much larger than the internal switch capacitance provided by the contacts 908. For example, an order of magnitude (i.e., ten times) or larger will provide more accurate sensing of switch closure when conventional micro-switches are used. In other embodiments, custom switches may be used that employ very closely spaced contacts to minimize the internal capacitance of the switch 900. As a non-limiting example, contact spacing of two millimeters or less would be sufficient.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processing systems (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

What is claimed is:

1. An input device, comprising:
a first sensing region substantially overlapping a user input area, the first sensing region including;
a first plurality of sensor electrodes configured to sense objects in the first sensing region, and
a first plurality of routing traces ohmically coupled to the first plurality of sensor electrodes; and
a second sensing region adjacent to the first sensing region, the second sensing region including;
a second plurality of sensor electrodes configured to sense objects in the second sensing region, the second plurality of electrodes comprising a plurality of floating electrodes, and a plurality of coupling electrodes capacitively coupled to the plurality or floating electrodes, and
a second plurality of routing traces ohmically isolated from the plurality of floating electrodes, ohmically coupled to the plurality of coupling electrodes, and capacitively coupled to the plurality of floating electrodes via the plurality of coupling electrodes, wherein the second plurality of routing traces comprise a subset of the first plurality of routing traces; and
a processing system communicatively coupled to the first plurality of sensing electrodes via the first plurality of routing traces and operably coupled to the plurality of floating electrodes via the second plurality of routing traces, wherein the processing system is configured to:
multiplex the subset of the first plurality of routing traces between the first sensing region and the second sensing region in order to receive capacitively coupled input from the first sensing region and the second sensing region.

2. The input device or claim 1, wherein the processing system is configured to:
operate the first plurality of sensor electrodes in a trans-capacitive mode; and
operate the second plurality of sensor electrodes in an absolute capacitive mode.

3. The input device of claim 1, wherein the processing system is configured to:
operate the first plurality of sensor electrodes in an absolute capacitive mode; and
operate the second plurality of sensor electrodes in an absolute capacitive mode.

4. The input device of claim 1, wherein the processing system is configured to processes input from at least the second plurality of sensor electrodes to determine whether the input device is being held in a left hand or a right hand of a user.

5. The input device of claim 1, wherein the processing system is configured to processes input from at least the second plurality of sensor electrodes to determine the orientation of the input device.

6. The input device of claim 1, wherein the second plurality of sensor electrodes are configured to provide a slide control input to the processing system.

7. The input device of claim 1, wherein the processing system is configured to selectively operate the second plurality of routing traces as guard traces to provide shielding to the first plurality of sensor electrodes.

8. The input device of claim 1, further comprising a switch coupled to a reference potential and a respective sensor electrode of the second plurality of sensor electrodes, whereby when the switch is pressed, the electrode is brought to the reference potential resulting in a measureable change in capacitive coupling between the respective sensor electrode and a respective routing trace of the second plurality of routing traces.

9. The input device of claim 1, wherein the user input area at least partially overlaps a display.

10. The input device of claim 1, further comprising:
a third sensing region adjacent to the first sensing region, the third sensing region including:
   a third plurality of sensor electrodes configured to sense objects in the third sensing region; and
   a third plurality of routing traces ohmically isolated from the third plurality of sensor electrodes and capacitively coupled to the third plurality of sensor electrodes.

11. A processing system for an input device, comprising;
a memory storing instructions; and
a processor coupled to the memory for executing the instructions, the processor including:
   a first input for receiving signals from a first plurality of sensor electrodes via a first plurality of routing traces ohmically coupled to the first plurality of sensor electrodes, the first plurality of sensor electrodes positioned in first plane to form a first sensing region; and
   a second input for receiving signals from a second plurality of sensor electrodes via a second plurality of routing traces, the second plurality of electrodes comprising a plurality of floating electrodes, and a plurality of coupling electrodes capacitively coupled to the plurality of floating electrodes, the second plurality of routing traces being ohmically isolated from the plurality of floating electrodes and capacitively coupled to the plurality of floating electrodes via the plurality of coupling electrodes, the second plurality of sensor electrodes positioned in second plane that is non-parallel to the first plane to form a second sensing region,
wherein the second plurality of routing traces comprises a subset of the first plurality of routing traces and the memory comprises instructions for the processor to multiplex the subset of the first plurality of routing traces between the first sensing region and the second sensing region in order to receive capacitively coupled input from the first sensing region and the second sensing region.

12. The processing system of claim 11, wherein the processor is configured to:
operate the first plurality of sensor electrodes in a trans-capacitive mode; and
operate the second plurality of sensor electrodes in an absolute capacitive mode.

13. The processing system of claim 11, wherein the processor is configured to:
operate the first plurality of sensor electrodes in an absolute capacitive mode; and
operate the second plurality of sensor electrodes in an absolute capacitive mode.

14. The processing system of claim 11, wherein the processor operates the second plurality of sensor electrodes to provide a slide control input to the processor.

15. The processing system of claim 11, wherein the memory contains instruction for the processor to selectively operate the second plurality of routing traces as guard traces to provide shielding to the first plurality of sensor electrodes.

16. The processing system of claim 11, further comprising a switch coupled to a reference potential and a respective sensor electrode of the second plurality of sensor electrodes, whereby when the switch is pressed, the electrode is brought to the reference potential resulting in the processor can detect a measureable change in capacitive coupling between the respective sensor electrode and a respective routing trace of the second plurality of routing traces.

17. A device, comprising:
a housing haying a top surface and an edge surface;
a display positioned to be viewed on the top surface;
a first plurality of sensor electrodes and a first plurality of routing traces ohmically coupled to the first plurality of sensor electrodes configured to sense objects in a first sensing region, the first sensing region substantially overlapping the top surface; and
a second plurality of sensor electrodes and a second plurality of routing traces configured to sense objects in a second sensing region, the second sensing region at least partly overlapping the side surface, the second plurality of electrodes comprising a plurality of floating electrodes, and a plurality of coupling electrodes capacitively coupled to the plurality of floating electrodes, and the second plurality of routing traces ohmically isolated from the plurality of floating electrodes, ohmically coupled to the plurality of coupling electrodes, and capacitively coupled to the plurality of floating electrodes via the plurality of coupling electrodes, wherein the second plurality of routing traces comprise a subset of the first plurality of routing traces: and
a processing system communicatively coupled to the first plurality of sensing electrodes via the first plurality of routing traces and operably coupled to the plurality of floating electrodes via the second plurality of routing traces, wherein the processing system is configured to:
multiplex the subset of the first plurality of routing traces between the first sensing region and the second sensing region in order to receive capacitively coupled input from the first sensing region and the second sensing region.

* * * * *